March 29, 1932.  A. A. PONSONBY  1,851,727

STORAGE BATTERY LOCOMOTIVE

Filed May 28, 1930

INVENTOR

Amos A. Ponsonby.

BY
ATTORNEY

Patented Mar. 29, 1932

1,851,727

UNITED STATES PATENT OFFICE

AMOS A. PONSONBY, OF WILKINSBURG, PENNSYLVANIA, ASSIGNOR TO WESTINGHOUSE ELECTRIC & MANUFACTURING COMPANY, A CORPORATION OF PENNSYLVANIA

STORAGE BATTERY LOCOMOTIVE

Application filed May 28, 1930. Serial No. 456,371.

My invention relates to electric locomotives and more particularly to locomotives of the small storage-battery type adapted for use in shaft mines.

In order to be suitable for use in mines in which the locomotives are moved from one level to another in cages, the locomotives must be of comparatively small dimensions, particularly as to length. For convenience when operating the locomotive, it is desirable to provide as much space as possible for the operator within the small overall dimensions of the locomotive.

An object of my invention, generally stated, is to provide a storage-battery locomotive which shall be simple and efficient in operation, and which may be readily and economically manufactured.

A more specific object of my invention is to provide for reducing the overall length of a storage battery locomotive to permit the loading of it into elevator cages.

Another object of the invention is to provide an operator's compartment as a part of the main chassis of the locomotive.

A further object of the invention is to provide for transferring the battery crate from the locomotive chassis to a charging rack by a mechanical means.

For a fuller understanding of the nature and objects of the invention, reference may be had to the following detailed description, taken in conjunction with the accompanying drawings, in which.

Figure 1:
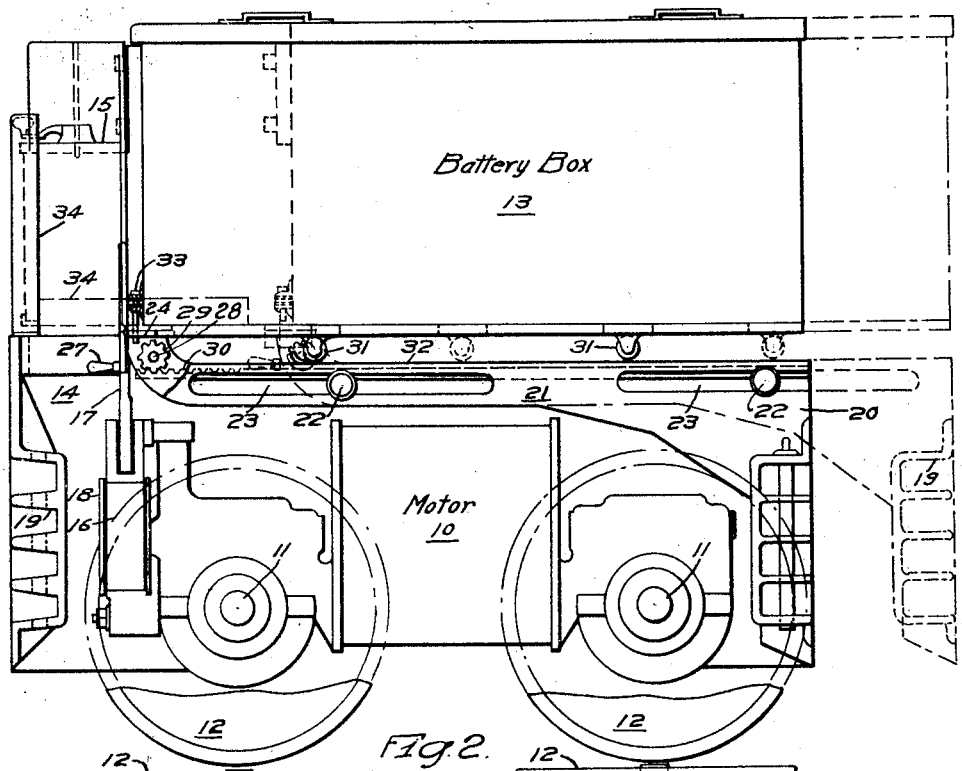
Figure 1 is a view, in side elevation, of a storage battery locomotive constructed in accordance with my invention, showing, in full lines, the battery box and the coupler socket disposed for caging and, in broken lines, these parts moved to the operative position.
Figure 2:
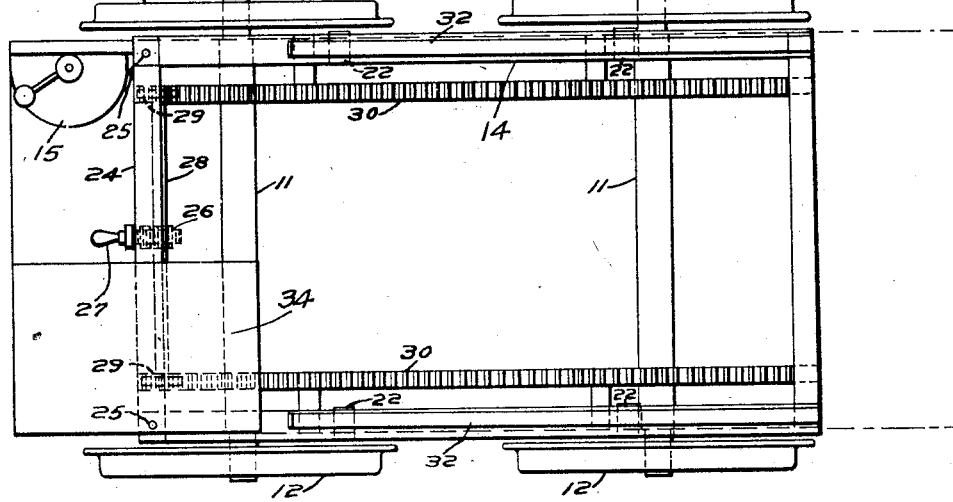
Fig. 2 is a top plan view of the locomotive illustrated in Fig. 1, a part of the equipment being removed in order to show details of the construction.

Referring now to the drawings, the locomotive shown comprises a motor 10 which is geared to wheel axles 11, thereby driving wheels 12. The power for operating the motor 10 is supplied by a storage battery located in a battery box 13, which is mounted on top of the locomotive chassis 14. A drum controller 15 is provided at the front end of the locomotive in order to control the operation of the motor 10.

A brake 16, of the usual friction type, which may be actuated by a handle 17, is provided for engaging a brake drum 18 mounted on one end of the armature shaft of the motor 10. Further details of the electrical connections and driving mechanism will not be described in this specification, as they may be of any standard construction well known in the art.

It will be observed that coupler sockets 19 are provided at each end of the locomotive. The coupler sockets at the front end of the locomotive are stationary as they are rigidly attached to the locomotive chassis 14, but those at the rear end are provided in a movable drawbar 20 which is disposed to be telescoped in the locomotive chassis 14. As shown, the drawbar 20 is provided with arms 21 which extend horizontally along each side of the locomotive chassis and are supported by rollers 22 which are mounted on the sides of the locomotive frame. Two slots 23 are provided in each of the arms 21 for receiving the rollers 22. The slots 23 function as guides for the drawbar 20 and limit the movement of the drawbar when it is actuated to its extended position. It will be observed that the front ends of the arms 21 are curved upwardly to permit them being joined by a cross piece 24 which extends across the top of the locomotive chassis 14. The cross piece 24 may be connected to the arms 21 by bolts or pins 25.

In order that the drawbar 20 may be extended to the operating position, indicated by the broken lines, a worm-gear mechanism 26 is mounted on the cross piece 24. A hand crank 27 is provided for operating the worm gear 26, which rotates a shaft 28 also carried by the cross piece 24. A pinion 29 is provided at each end of the shaft 28, which extends across the locomotive chassis 14. Each of the pinions 29 engage a rack 30 which is attached to the side of the locomotive chassis 14 and extends the entire length of the locomotive chassis.

With a view to providing space for an operator while operating the locomotive, the battery box 13 is mounted on wheels 31 and is disposed to be moved backwards on rails 32, one of which is provided at each side of the locomotive chassis. As shown, the battery box 13 is connected to the cross piece 24 by a pin 33 and may be rolled either forward or backward by operating the worm gear 26, which drives the pinions 29 along the racks 30.

When the battery box 13 has been shifted backward to the position indicated in the drawings by the broken lines, a seat 34, which is hinged to the front end of the locomotive, may be lowered to a horizontal position, as indicated by the broken lines, thereby providing a space for the operator.

Since the battery box 13 is connected to the cross piece 24, it will be readily understood that by turning the crank 27, which operates the worm gear 26, both the drawbar 20 and the battery box 13 may be moved to their extended positions, which is the normal operative position.

When it is desired to cage the locomotive, the seat 34 may be raised to the vertical position and both the drawbar 20 and the battery box 13 moved forward by operating the crank 27, thereby decreasing the overall length of the locomotive which will permit it to be loaded into the elevator cage.

In case it is desired to remove the battery from the locomotive and place it on a charging rack for charging the battery, this may be readily accomplished by removing the pins 25, by which the cross piece 24 is secured to the arms 21, and turning the crank 27. The battery box 13 may thus be moved by operating the gear 26, which drives the pinions 29 along the racks 30, until the pinions reach the rear end of the racks 30. Then the battery box may be completely disconnected from the locomotive by removing the pin 33, which attaches the box to the cross piece 24. The box 13 may be readily replaced on the locomotive by reversing the above-described operation.

I do not desire to be restricted to the specific embodiment of my invention herein shown and described since it is evident that it may be changed and modified without departing from the spirit and scope of my invention, as defined in the appended claims.

I claim as my invention:

1. In a storage-battery locomotive, in combination, a chassis, a movable battery box mounted on said chassis, and mechanical means for moving the battery box backward on the chassis to provide space for an operator or forward on the chassis to reduce the overall length of the locomotive for caging.

2. In a storage-battery locomotive, in combination, a chassis, an adjustable coupler socket mounted on said chassis, a rack and a pinion disposed to be actuated by a crank for extending the coupler socket to the operative position and for returning it from the operative position, and means for limiting the movement of the coupler socket.

3. In a storage-battery locomotive, in combination, a chassis, a movable battery box mounted on said chassis, an adjustable coupler socket, and mechanical means for extending the battery box and coupler socket to the operative position to provide space for an operator and for retrieving them from the operative position to reduce the overall length of the locomotive for caging.

4. In a storage-battery locomotive, in combination, a chassis, a movable battery box mounted on said chassis, a plurality of rollers disposed on the battery box, a track disposed on the chassis to cooperate with said rollers to support the battery box, a rack disposed on said chassis, a pinion disposed to cooperate with the rack to move the battery box in a horizontal plane, a worm-gear mechanism for driving said pinion, and a crank for actuating said gear mechanism, whereby the battery box may be removed from the chassis.

5. In a storage-battery locomotive, in combination, a chassis, a folding seat mounted on said chassis, and a battery box disposed to be moved in a horizontal plane to permit said seat to be lowered to provide space for an operator.

6. In a storage-battery locomotive, in combination, a chassis, a folding seat mounted on said chassis, a movable battery box, and mechanical means for moving the battery box in a horizontal plane to permit the seat to be lowered to provide space for an operator.

In testimony whereof, I have hereunto subscribed my name this 22nd day of May 1930.

AMOS A. PONSONBY.